United States Patent [19]

Ford et al.

[11] Patent Number: 5,064,449
[45] Date of Patent: Nov. 12, 1991

[54] FLUID DEGASSING

[75] Inventors: Lionel H. Ford, Blackpool; Stephen A. Taylor, Preston, both of England

[73] Assignee: United Kingdom Atomic Energy Authority, England

[21] Appl. No.: 586,408

[22] Filed: Sep. 21, 1990

[30] Foreign Application Priority Data

Sep. 23, 1989 [GB] United Kingdom ............... 8921566

[51] Int. Cl.$^5$ .............................................. B01D 19/00
[52] U.S. Cl. ............................................. 55/52; 55/53
[58] Field of Search ................................ 55/52, 53, 55

[56] References Cited

U.S. PATENT DOCUMENTS

| | | | |
|---|---|---|---|
| 3,358,425 | 12/1967 | Burnham | 55/52 |
| 3,778,969 | 12/1973 | Sudduth | 55/55 |
| 3,973,930 | 8/1976 | Burgess | 55/52 X |
| 4,345,920 | 8/1982 | Ross | 55/55 X |
| 4,422,476 | 12/1983 | Blanchard | 137/810 |
| 4,585,465 | 4/1986 | Suzuki et al. | 55/52 |
| 4,657,565 | 4/1987 | Siekmann | 55/55 |

Primary Examiner—Charles Hart
Attorney, Agent, or Firm—King and Schickli

[57] ABSTRACT

Cavitation takes place in a fluid flow passing through a constriction, such as a reduced bore in a pipe, to release dissolved gases. The gases can be collected and the fluid can flow along a diffuser section to recover pressure. The constriction can be formed by the axial outlet part of a votex valve included in the flow line. Cavitation in the fluid can be regulated by the control fluid supplied to the vortex valve.

8 Claims, 4 Drawing Sheets

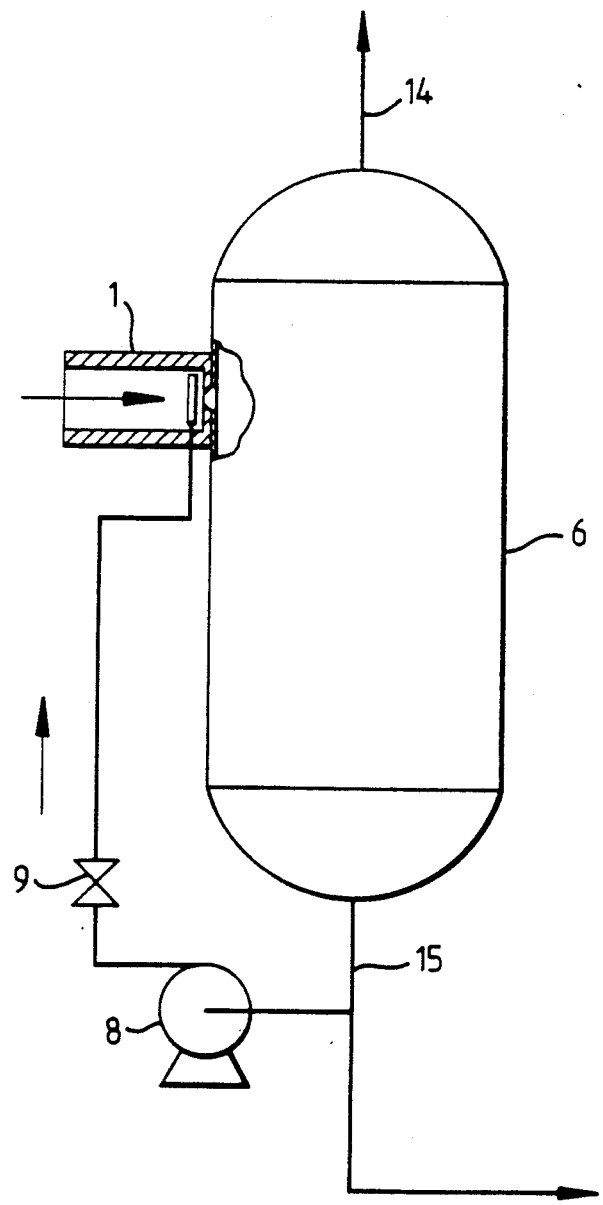

FLUID DEGASSING

The present invention concerns fluid degassing or cavitation.

Degassing or cavitation can occur in a flowing liquid, slurry or like fluid when the flow encounters a pressure drop which is sufficient to release dissolved gases from the flow. Thus cavitation can occur when a liquid flow in a pipeline encounters a constriction in the bore of the pipeline which can cause dissolved gas to be released from the liquid.

According to the present invention there is provided a method of degassing a fluid flow which comprises locating a vortex valve having a vortex chamber with radial inlet, axial outlet and tangential control ports in the fluid flow line, regulating the pressure drop across the vortex chamber to cause cavitation with the release of dissolved gases in the flow at the outlet and removing said gases from the fluid flow.

The axial outlet from the vortex chamber forms a constriction to the flow and released gas can be removed from the remainder of the flow by locating a collection pipe at the outlet. The outlet can be connected directly to an enlarged volume or disentrainment vessel. Conveniently an axial diffuser can be arranged between the outlet from the vortex chamber and the disentrainment vessel. In the disentrainment vessel the gas can be taken off from the top of the vessel and degassed liquid can be collected at the bottom of the vessel. The degassed liquid can be returned to the main fluid flow upstream or downstream of the outlet from the vortex chamber. Conveniently the degassed liquid can be introduced at the tangential control ports into the vortex chamber. A pump and an adjustable valve can be provided in the flow line to the tangential control ports. Alternatively the control flow from can be taken from the main fluid flow from a position upstream of the vortex valve. Yet again the control flow can be from a separate independent supply.

The invention will be described further, by way of example, with reference to the accompanying diagrammatic drawings; in which.

FIGS. 3 to 6 respectively show alternative arrangements of a vortex valve in the fluid flow line and associated with a disentrainment vessel.

Figure 1:
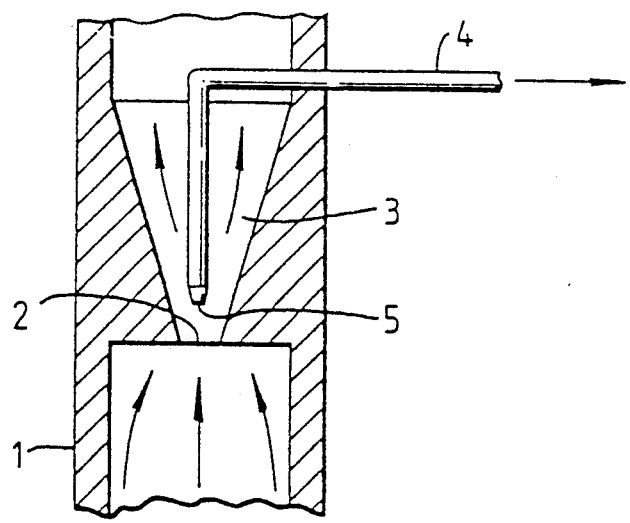
FIG. 1 illustrates an arrangement for degassing a fluid flow.

In FIG. 1, a liquid flowing along a pipe 1 encounters a constriction 2 formed by a sharp, sudden reduction in the bore of the pipe. A diffuser section 3 is formed immediately downstream of the constriction 2. A conduit 4 having an end 5 positioned centrally at the constriction is located axially in the diffuser section 3. The conduit 4 emerges through the wall of the pipe downstream of the constriction.

In use, liquid flowing along the pipe 1 is forced through the constriction 2. The liquid velocity is such that cavitation occurs in the liquid at the constriction 2 and dissolved gas or gases released from the liquid. The dissolved gases so released are collected by the conduit 4.

The degassed liquid emerging from the constriction 2 flows along the diffuser section 3 where pressure is recovered.

Figure 2:
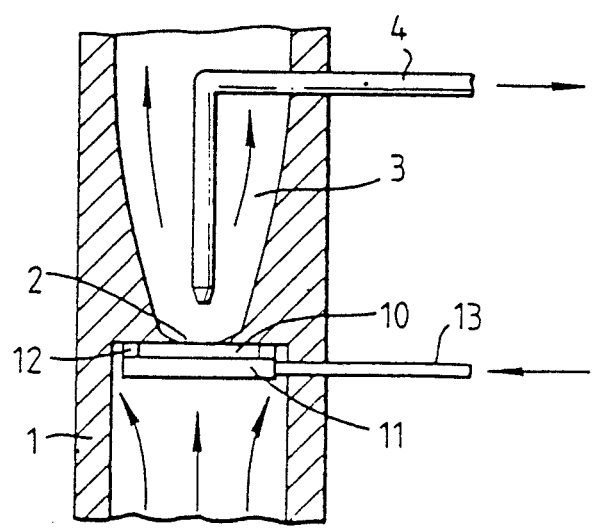
FIG. 2 shows the arrangement of FIG. 1 when modified by the inclusion of a vortex valve in the fluid flow line.

FIG. 2 is similar to FIG. 1 but with the addition of a vortex valve immediately upstream of the constriction 2. A vortex valve is a fluidic device which does not have moving parts or seals which can deteriorate during use. The vortex valve comprises a vortex chamber through which a main flow passes radially to emerge at an axial outlet, the main flow being regulated by a control flow introduced tangentially into the vortex chamber. An example of a vortex valve is disclosed in U.S. Pat. No. 4,422,476.

In the present arrangement the vortex chamber 10 is formed by a plate 11 located within the bore of the pipe 1 at a position adjacent to and parallel to the constriction 2. The plate can be located in position by spacers 12 which also define tangentially directed ports of the control flow. Main flow in the pipe passes over the edge or rim of the plate 11 to enter the vortex chamber in an inwardly radial direction. The flow emerges at the constriction 2 which constitutes the axial outlet from the chamber 10 of the vortex valve. Flow through the vortex chamber is regulated by the control flow introduced along flow line 13 to the tangentially directed ports in the spacers 12. The control flow along line 13 can be from an independent, separate supply and a pump can be included in the flow line 13. The diffuser section 3 downstream of the constriction serves to recover pressure in the swirling flow emerging from the constriction.

As in FIG. 1, conduit 4 having one end positioned centrally at the construction 2 is located axially in the diffuser section. The conduit 4 emerges through the wall of the pipe 1 downstream of the constriction.

Cavitation or degassing takes place when the flow encounters a pressure drop which is sufficient to release dissolved gases from the flow. It has been found that the outlet flow from the vortex chamber 10 will cavitate due to main flow only or a combination of main flow and control flow. By adjusting the ratio of main flow to control flow it is possible to cavitate and degas flow over a wide range of flowrates. In one arrangement the control flow can be taken directly from the main flow at a position upstream of the vortex valve and a flow ratio control valve can be included in the main flow line or pipe 1 at a position between the control flow take up position and the vortex valve.

Figure 3:
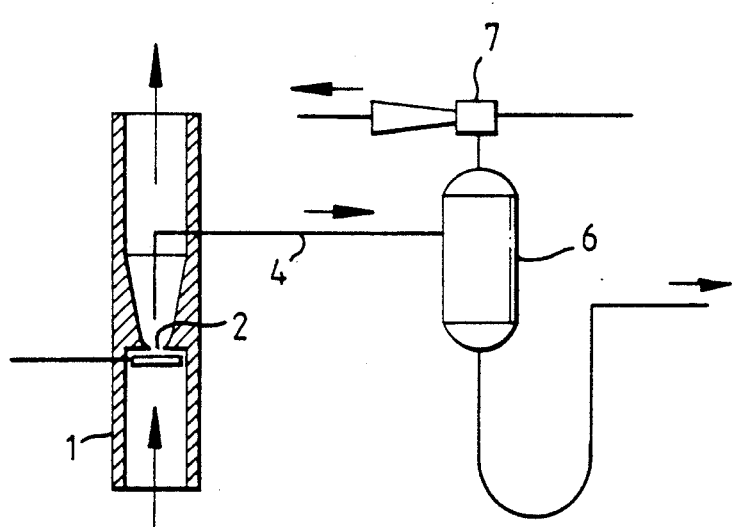
Figure 4:
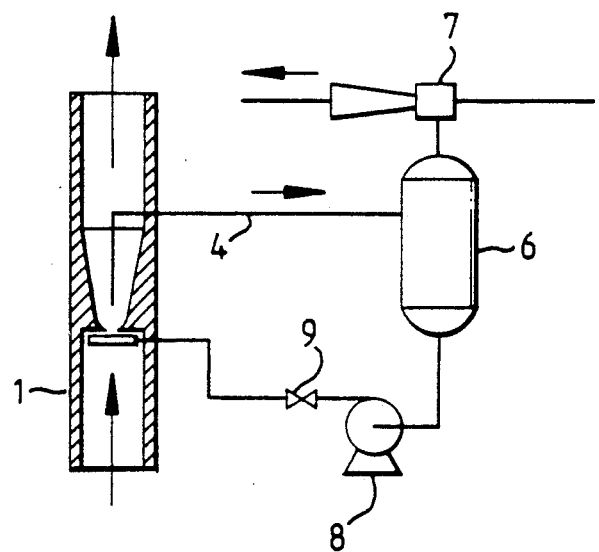

In FIG. 3, an enlarged volume or disentrainment vessel 6 is coupled to the end of the conduit 4 emerging through the wall of the pipe 1. In the vessel 6 any liquid passing along the conduit 4 will be separated from the gas released by cavitation at the constriction 2. An ejector 7 driven by compressed gas may be required to maintain a depression within the vessel 6. Gas is drawn off at the top of the vessel and through the ejector. Degassed liquid is recovered at the bottom of the vessel. The degassed liquid can be returned to the pipe 1. With reference to FIG. 4, the degassed liquid from the disentrainment vessel provides the control flow to the tangential parts of the vortex valve. A pump 8 and an adjustable valve 9 can be included in the flow line of the control flow.

Figure 5:
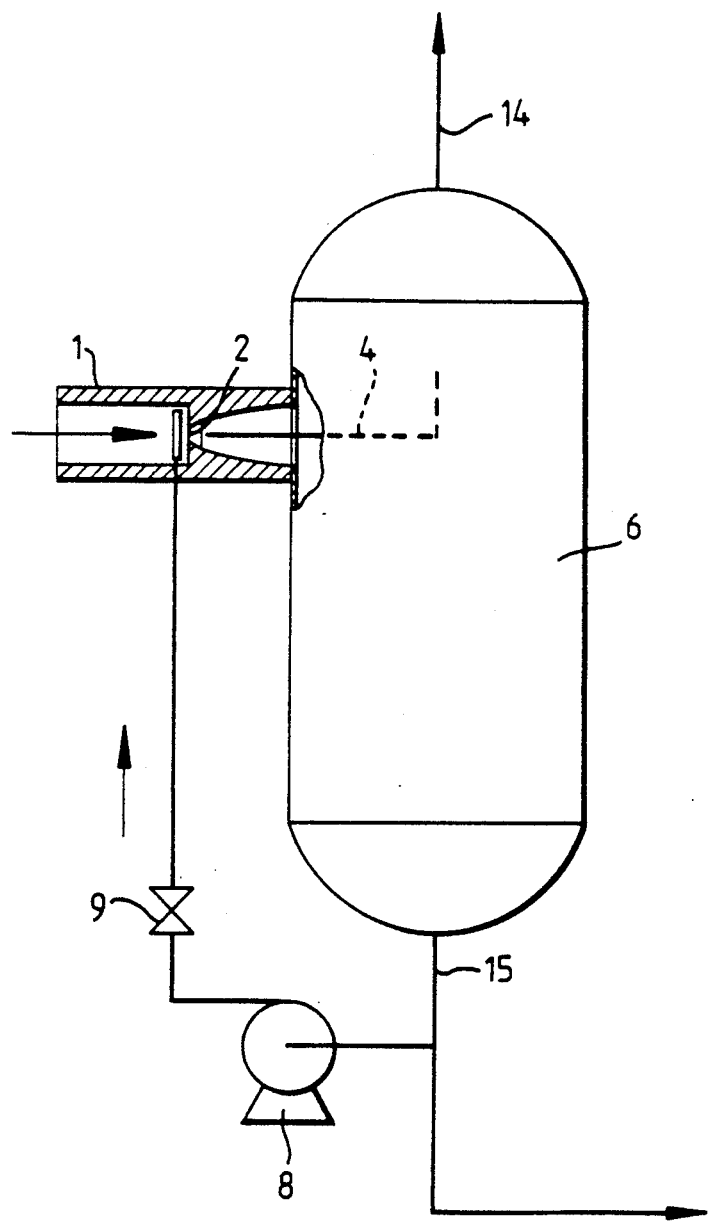

In FIGS. 5 and 6 the pipe 1 communicates directly with the disentrainment vessel 6. In FIG. 5, dissolved gas released from the liquid at the constriction 2 is collected by the conduit 4 to flow from the top of the vessel 6 along conduit 14. Gas which escapes the conduit 4 will enter the vessel with the liquid from pipe 1 to disentrain within the vessel 6. Degassed liquid emerges at outlet 15 at the bottom of the vessel 6. A portion or all of the degassed liquid can be used as a control flow for the vortex valve.

In FIG. 6, the diffuser section 3 and the conduit 4 have been omitted and the liquid with gas separated by cavitation at the vortex valve pass immediately into the disentrainment vessel 6.

The flow along the pipe 1 can be a liquid or a slurry. As an example of the latter the flow can be "mud" as used in the oil and gas industries for drilling.

We claim:

1. A method of degassing a fluid flow in a fluid flow line which comprises locating a vortex valve, having a vortex chamber with a radial inlet port for main flow, an axial outlet port and a tangential control port for control flow, in the fluid flow line; regulating the pressure drop across the vortex chamber by adjusting the ratio of main flow to control flow so as to cause cavitation with the release of dissolved gases in the flow at the outlet; and removing said gases from the fluid flow.

2. A method of degassing a fluid according to claim 1 which comprises removing the gases from the flow by locating a collection pipe at the outlet of the vortex valve.

3. A method of degassing a fluid according to claim 1 which comprises connecting the outlet of the vortex valve directly to a disentrainment vessel.

4. A method of degassing a fluid according to claim 3 which comprises inserting an axial diffuser between the outlet of the vortex valve and the disentrainment vessel.

5. A method of degassing a fluid according to claim 3 which comprises returning at least a part of degassed fluid from the disentrainment vessel to the vortex valve.

6. A method of degassing a fluid according to claim 5 which comprises which comprises adjustably controlling the return fluid flow to the vortex valve.

7. A method of degassing a fluid according to claim 2 which comprises connecting the outlet of the vortex valve directly to a disentrainment vessel.

8. A method of degassing a fluid according to claim 4 which comprises returning at least a part of degassed fluid from the disentrainment vessel to the vortex value.

* * * * *